US006801883B1

(12) United States Patent
Hurlock (10) Patent No.: US 6,801,883 B1
(45) Date of Patent: Oct. 5, 2004

(54) CODE TYPE CONTROL OF CACHING PARAMETERS

(75) Inventor: Steven Hurlock, Wynnewood, PA (US)

(73) Assignee: Unisys Corporation, Blue Bell, PA (US)

(*) Notice: Subject to any disclaimer, the term of this patent is extended or adjusted under 35 U.S.C. 154(b) by 843 days.

(21) Appl. No.: 09/585,746

(22) Filed: Jun. 2, 2000

(51) Int. Cl.[7] ............................ G06F 7/60; G06F 17/10; G06F 101/00
(52) U.S. Cl. .............................. 703/2; 763/22; 711/118
(58) Field of Search ............................ 703/1–2, 21–22; 711/118–146, 159

(56) References Cited

U.S. PATENT DOCUMENTS

| 5,574,883 A | * | 11/1996 | Freeman | 711/119 |
| 5,634,108 A | * | 5/1997 | Freeman | 711/118 |
| 5,943,687 A | | 8/1999 | Liedberg | 711/156 |
| 6,378,044 B1 | * | 4/2002 | Luce et al. | 711/133 |

OTHER PUBLICATIONS

Charney et al, "Prefetching and Memory System Behavior of the SPEC95 Benchmark Suite," IBM Journal of Research and Development, vol. 41 No. 3, pp. 265–286 (May 1997).*
McFarling, "Cache Replacement with Dynamic Exclusion," ACM Proceedings of the 19th Annual International Symposium on Computer Architecture, pp. 191–200 (Jul. 1992).*
Whalley, "Fast Instruction Cache Performance Evaluation Using Compile–Time Analysis," Proceedings of the 1992 ACM SIGMETRICS Joint International Conference on Measurement and Modeling of Computer Systems, pp. 13–22 (Jun. 1992).*

* cited by examiner

Primary Examiner—Samuel Broda, Esq.
(74) Attorney, Agent, or Firm—Michael B. Atlass; Woodcock Washburn LLP; Mark T. Starr (57) ABSTRACT

A code evaluation algorithm is used to determine optimal cache parameters. In evaluating the code, the algorithm uses a set of code characteristics the presence of which, or the degree of presence of which, impact the proper selection of cache parameters. Once the code characteristics have been selected, the algorithm uses boolean truth state tables or fuzzy logic membership set definitions to specify whether and when each code characteristic is true or false (i.e., present or absent) for a given set of code instructions. Programs are classified as having the following characteristics: 1) arithmetic intensive; 2) logic/decision intensive; 3) reference intensive; and/or 4) array/vector/table processing. To evaluate the code, the degree of presence or absence of these characteristics is described in logical fashion, using fuzzy logic. To logically evaluate and relate such "fuzzy" concepts, the algorithm uses fuzzy logic membership functions to determine the degree to which there exist a small number, medium number or large number of instances of a particular class of operator in the code analyzed. Next, the algorithm defines a fuzzy logic rule base which relates (e.g., by implication) the presence or absence (i.e., truth or falsehood) of the condition impacting proper selection of cache parameters to conclusions regarding the selection of cache parameters. The algorithm then determines (evaluates) the conclusions regarding the proper selection of cache parameters by evaluating the conditions impacting the conclusions while applying the rule base rules. In particular, the algorithm uses the "Mandani Product" inference engine for computational simplicity. The center of gravity of the fuzzy outcomes is computed and the result is discretized yielding a crisp, meaningful result representing an optimal cache parameter choice.

28 Claims, 10 Drawing Sheets

MEMORY ADDRESS

Bit Positions

| Tag | Index | Offset |
|---|---|---|
| .... 15 14 13 12 11 | 10 9 8 7 6 5 4 3 2 | 1 0 |
| (x bits) | (9 bits) | (2 bits) |

CACHE

|   | V | Tag (x bits) | Data (y bits) |
|---|---|---|---|
| 0 | | | |
| 1 | | | |
| 2 | | | |
| 3 | | | |
| 4 | | | |
| 5 | | | |
| 6 | | | |
| 7 | | | |
| - | | | |
| - | | | |
| - | | | |
| - | | | |
| 254 | | | |
| 255 | | | |

FIGURE 6

CODE TYPE CONTROL OF CACHING PARAMETERS

FIELD OF THE INVENTION

The present invention generally relates to the field of cache design and implementation. More particularly, the present invention relates to a method and apparatus for automatically selecting and implementing optimal parameters for a cache associated with a computer processor by analyzing the type of instruction code executed by the processor.

BACKGROUND OF THE INVENTION

Problem Addressed

It is well known that computers (e.g., mainframes, PC's, servers, etc.) generally include a Central Processing Unit ("CPU") which functions to fetch and execute programs and manipulate data in an associated memory. Thus, a CPU's associated memory typically contains executable instructions and data processed during program execution.

In general, the speed of the CPU (i.e., the time it takes to perform one instruction) is faster than the access speed of the CPU's main memory. Therefore, the CPU may idly wait for a requested instruction or data while the CPU's main memory cycles through a memory fetch operation.

In an effort to address this problem, hardware developers have, over time, employed memory configurations organized in hierarchical fashion. Specifically, memory hierarchies are organized as levels, with faster memories nearer the CPU and larger, slower memories away from the CPU. Using such a hierarchy, a developer can greatly improve access time by ensuring data most often accessed by the CPU is contained in the memories providing the fastest access. These memories are often referred to as "cache" memories.

While such "cache" memories necessarily improve processing efficiency and performance, developers desiring optimal performance must also properly determine various cache design parameters (e.g., cache size, number of cache sets, etc.)

For example, because cache memories contain relatively less data than main memory, the CPU may experience a "cache miss" during processing (i.e., a request for particular data or instructions not currently stored in the cache). In that event, the requested data or instructions must be retrieved from main memory, stored in cache memory and supplied to the CPU. As a result, processing efficiency is diminished.

One way of minimizing the number of cache misses is to properly select a cache design parameter referred to as the "cache replacement policy." The cache replacement policy is the strategy for selecting data to be removed form the cache when new data must be stored in the cache (e.g., during a "cache miss"). Preferably, the replacement policy (e.g., random replacement, least recently used replacement, etc.) is optimized such that data most frequently used by the CPU going forward is stored in cache memory.

Unfortunately, optimizing the cache replacement policy is not an easy task, particularly insofar as the developer does not know in advance what types of applications, and therefore what types of data or instructions, the CPU will process during code execution.

SUMMARY OF THE INVENTION

The present invention addresses this problem. In particular, in accordance with the present invention, before a processor executes any program code, an algorithm is first executed, on the same processor or another, which evaluates the code, and based on that evaluation provides outputs representing optimal caching parameters. In evaluating the code, the algorithm uses a set of code characteristics the presence of which, or the degree of presence of which, impact the proper selection of cache parameters. Once the code characteristics have been selected, the algorithm uses, for example, boolean truth state tables or fuzzy logic membership set definitions to specify whether and when each code characteristic is true or false (i.e., present or absent) for a given set of code instructions. The algorithm also uses a set of implications or rules (e.g., fuzzy or boolean logic rules) which intelligently relate the presence or absence of the code characteristics to outputs representing various cache parameter choices. Once the code characteristic (membership) truth functions and the rule base have been defined, the algorithm evaluates the truth or falsity of the code characteristic truth functions and, via the logic rules, propagates those values to conclusions regarding the proper selection of cache parameters. If necessary, the conclusions for each rule are weighted and, possibly, discretized to obtain crisp, meaningful decisions regarding cache parameters (e.g., decisions regarding the level of set associativity of the cache, the cache replacement policy etc.)

Once the cache parameter decisions are obtained, they are implemented and the cache associated with the processor is accordingly altered prior to, or contemporaneous with, execution of the source code.

Accordingly, one advantage of the present invention is that it improves the efficiency and speed of memory retrieval operations in computers with a processor, memory and associated cache.

Another advantage of the present invention is that it simplifies the organization and design of cache memories by automating intelligent decision making regarding cache parameters.

Further advantages of the present invention will become apparent from the more detailed description below.

BRIEF DESCRIPTION OF THE DRAWINGS

FIG. 8a illustrates graphically the discretization of the functional definitions illustrated in FIG. 7a.

DETAILED DESCRIPTION OF PREFERRED EMBODIMENTS

Figure 1:
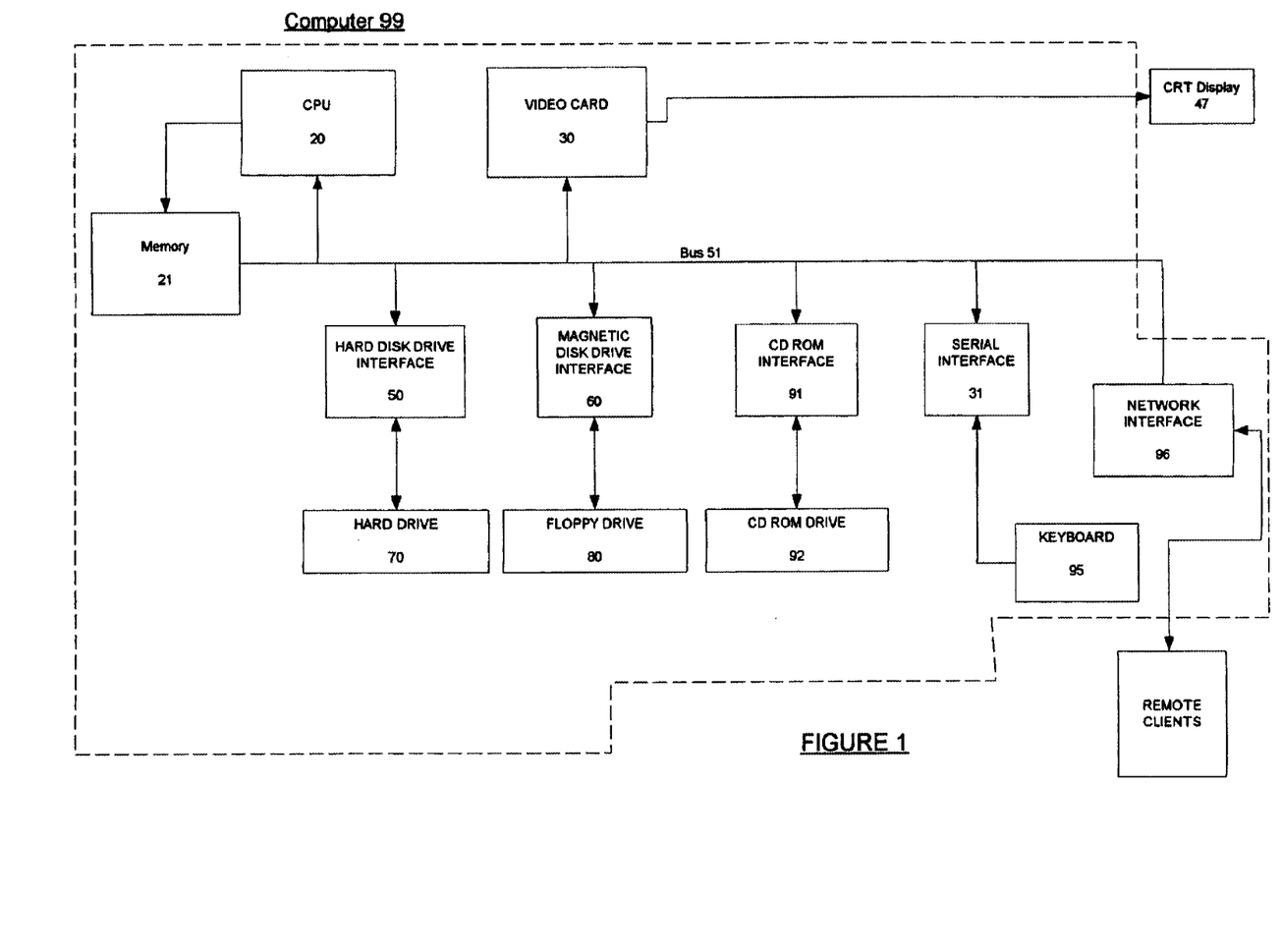
FIG. 1 is a block diagram illustrating hardware and software components of a conventional computing environment in which a cache parameter determination algorithm in accordance with an embodiment of the present invention may be implemented.

FIG. 1 is a block diagram illustrating hardware and software components of a conventional computing environment in which a cache parameter determination algorithm in accordance with an embodiment of the present invention may be implemented. More specifically, a computer 99 includes conventional computer hardware components including a Central Processing Unit ("CPU") 20, associated system memor(ies) 21, and a system bus 51 that couples the system memor(ies) 21 to CPU 20 and other computer system 99 components. Instructions comprising application program modules are typically stored in and retrieved from memor(ies) 21 by CPU 20, which executes said instructions.

A user may also enter commands and other input into the computer 99 via input devices such as a keyboard 95, mouse, scanner or other input device. The user may view displayed data on a display device 47, which is also coupled to the system bus 51 via a video graphics adaptor card 30. The display device 47 may be a CRT monitor, LCD terminal or other display.

Figure 2:
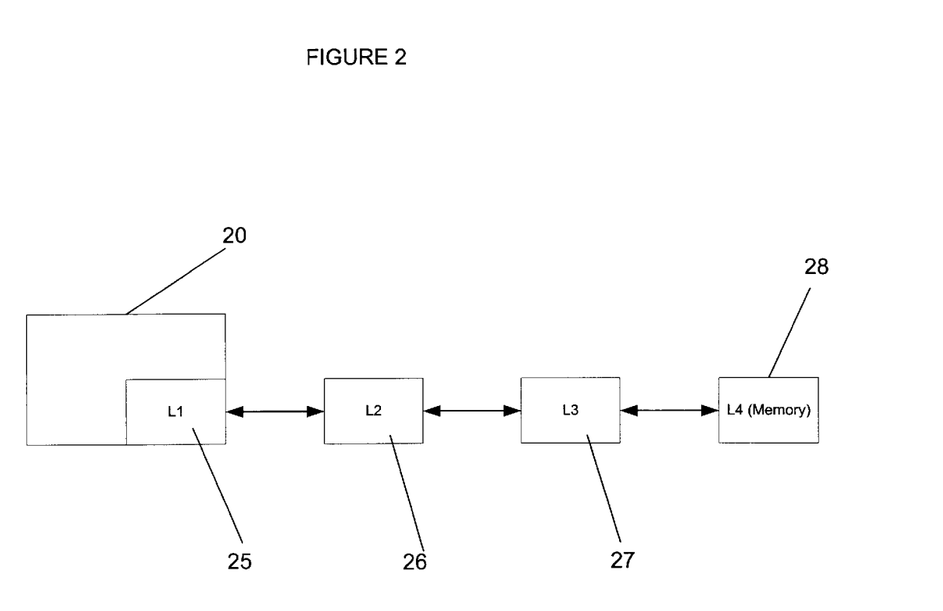
FIG. 2 is a block diagram illustrating the memory hierarchy, including cache memory, which may be incorporated in the memory component illustrated in FIG. 1.

Turning now to FIG. 2, it is a block diagram illustrating the memory hierarchy, including cache memory, which may be incorporated in the memor(ies) 21 component illustrated in FIG. 1. In particular, computer memories are organized into hierarchy levels, with faster access memory nearer the CPU 20 and larger, slower access memory away from the CPU 20. CPU 20 registers 25 (which are not considered conventional "memory") provide very rapid data access, and are at the top of the hierarchy. These registers 20 hold very little data. At the other end of the spectrum, conventional main memory 28 provides the slowest data access but stores greater amounts of data than the other memories. In the middle of the illustrated hierarchy are two fast access "cache" memor(ies) 26, 27 which hold less data than main memory 28. Thus, using the hierarchy illustrated, a developer can greatly improve CPU 20 data access time by ensuring data most often accessed by the CPU 20 is contained in the fastest memories, nearest the CPU (i.e., the "cache" memories).

While such "cache" memories necessarily improve processing efficiency and performance, developers desiring optimal performance first properly determine various cache design parameters (e.g., cache size, number of cache sets, cache replacement policy etc.) The importance of these cache design parameters is now illustrated with reference to FIGS. 3 and 5. The Figures illustrate the conventional operation of, and interaction between, the CPU 20, main memory 28, and cache memory 26 components illustrated in FIG. 2.

Figure 3:
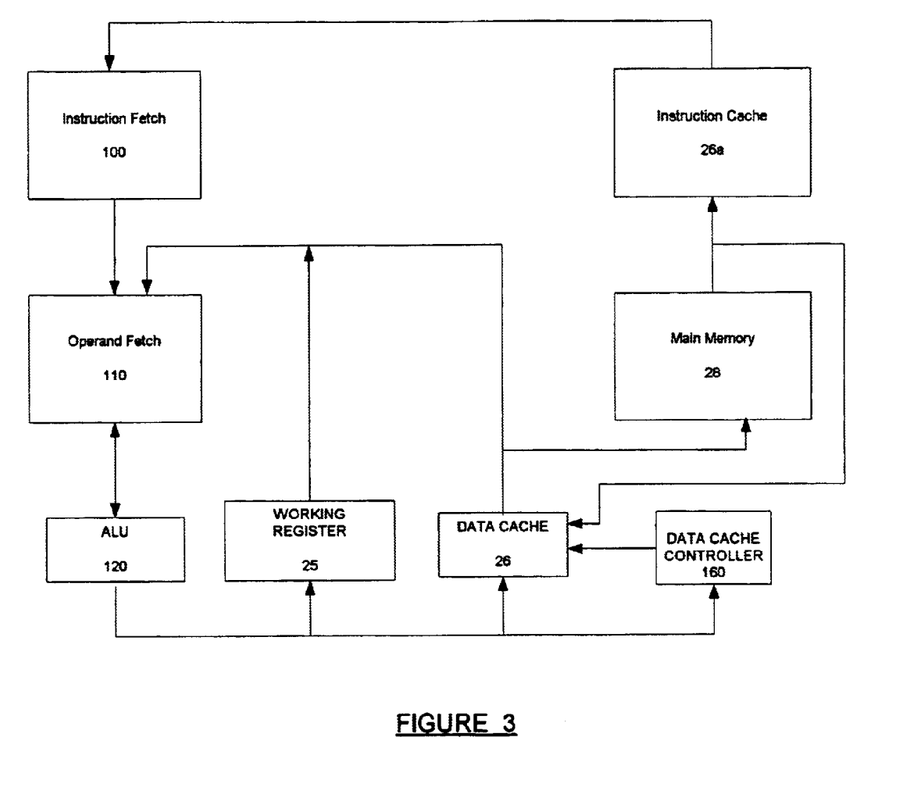
FIG. 3 is a block diagram illustrating the operation of, and interaction between, the main memory and cache memory components illustrated in FIG. 2 during execution of instruction code by the CPU component illustrated in FIG. 1.

Turning now to FIG. 3, during code execution, the CPU 20 retrieves instructions from main memory 28, or preferably from instruction cache 26a, using the instruction fetch component 100. The CPU 20 also retrieves data for the instructions (e.g., operands) from main memory 28, or preferably from data cache 26, using operand fetch logic 110. A retrieved instruction utilizing source operands can thus be executed by loading working registers 25 with the retrieved operand and processing the operand with the Arithmetic Logic Unit 120 in accordance with the retrieved instruction.

Such conventional instruction processing is, however, slowed considerably if the CPU 20 unsuccessfully attempts an operand retrieval from the data cache 26 (i.e., a cache miss is encountered). In the event of a cache miss, in addition to the unsuccessful data cache 276 access operation, the CPU 20 must also retrieve the operand from main memory 28, store the data in the data cache 26 and finally load the operand in working registers 25. Thus, it is clear that processing of an instruction resulting in a cache miss may involve even more processing time than would a simple memory access with no cache.

It is thus imperative that the number of cache misses encountered during code execution is minimized. In particular, when as a result of a cache miss a new operand is stored in the data cache 26, and an existing stored operand data is deleted, it is imperative that the operand data deleted be that which is least likely to be accessed later in the code execution. Therefore, it is desirable that an optimal protocol, referred to as a "cache replacement policy," be chosen for determining what data is deleted from the cache 26 when the CPU 20 encounters a cache miss. The optimal "cache replacement policy" is, in turn, a function of the types of instructions the CPU 20 is executing. For example, under a "Least Recently Used" cache replacement policy, the data deleted is that accessed least recently (i.e., timewise) by the CPU 20. Under a "Random Replacement Policy," the data deleted is randomly chosen. These policies may be implemented by the data cache controller 160, a processor dedicated to controlling data cache 26 operation.

Figure 5:
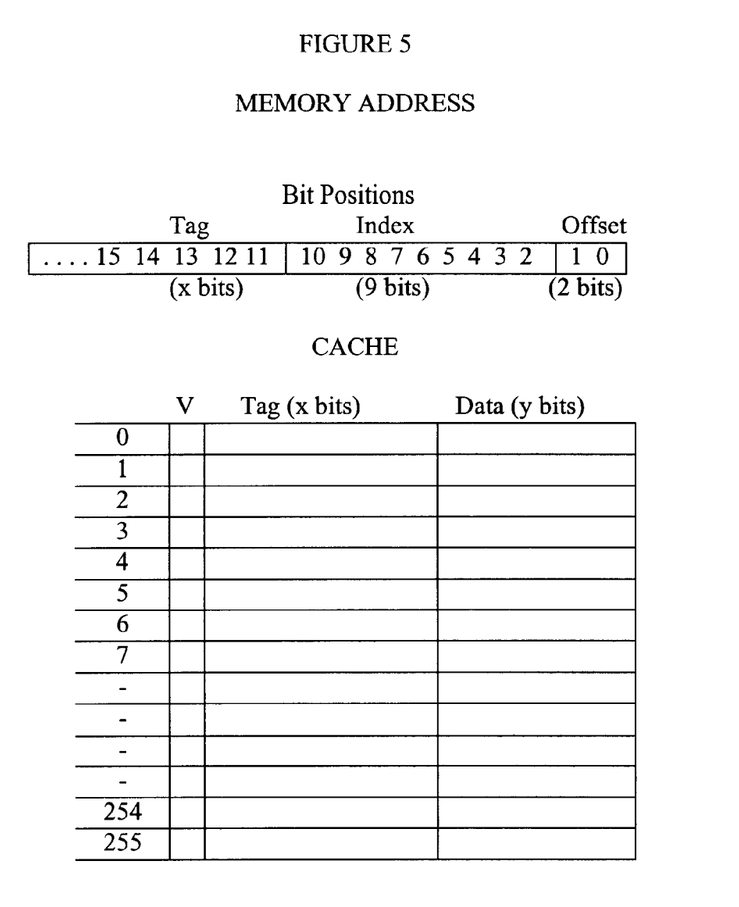
FIG. 5 further illustrates organization and structure of stored data in the cache memory component illustrated in FIGS. 2 and 3.

Apart from the decisions relating to cache replacement policy, choices relating to other cache parameters will also impact program execution efficiency. For example, a developer may choose to organize a cache memory as direct mapped cache, set associative or a fully associative. Referring now to FIG. 5, it illustrates the organization of a conventional direct mapped cache. As illustrated, in a direct mapped cache, each line (i.e., lines 0 through 255) of the cache directly corresponds to a block (e.g., a machine word) of memory. In particular, for each memory address, the corresponding cache line is obtained by applying the MOD function to the memory address. For example, if main memory is four times the size of a cache, then for each cache line "L," the function [address] MOD [# of=cache lines] will equal "L" for four corresponding memory addresses. Of course, the data for only one of these addresses can be actively stored in the cache.

In the cache illustrated, there are 256 cache lines, each consisting of valid, tag and data fields. The valid field is flag indicating whether data on the same cache line can be reliably retrieved. The Tag field is an identifier used to determine whether operand data required by the CPU 20 is in fact in cached. The data field contains the actual operand or other data required by CPU 20 for code execution.

Thus, during CPU 20 retrieval of data operand from data cache 26, the data cache controller 16 determines the cache line using the index portion (illustrated in FIG. 5) of the CPU 20 supplied memory address of the data operand. In the example illustrated, the index portion is nine bits long, which means that the index can map to each of the $2^9=256$ possible cache lines (i.e., lines 0 through 255). Once the cache line is determined, the cache controller 160 compares the tag portion of the given address to the tag portion of the selected cache line. If the tag fields are equal, and if the valid field is on, then the data required by CPU 20 has been found and the cache controller returns the data in the data field of the selected line (i.e., the CPU 20 encounters a "cache hit"). Otherwise, the CPU 20 has encountered a "cache miss."

As noted above, while a direct mapped cache is illustrated in FIG. 5, a cache my also be organized as a set associative cache or a fully associative cache. In a fully associative cache, to determine whether the cache 26 contains data corresponding to a CPU 20 supplied memory address, the cache controller 160 simultaneously compares the tag field of each cache line with the tag portion of the supplied address. Thus, to implement a cache that is fully associative, the cache controller 160 must include a comparator circuit for each cache line.

By contrast, unlike the direct mapped cache which exhibits no associativity, and the fully associative cache which requires that all entries be searched in parallel, the set associative cache features limited associativity. In particular, the cache is divided into sets of cache lines. A two-way set-associative cache has two lines in each set, a four-way set-associative cache has four lines in each set and so on. To determine whether the cache 26 contains data corresponding to a CPU 20 supplied memory address, the cache controller 160 simultaneously compares the tag portion of the supplied address tag with the tag field of each cache line in a selected set (i.e., compares the CPU 20 supplied tag field with the tag field in each of two lines in a two way set associative cache, in each of four lines in a four way set associative cache, etc.) That is, the data cache controller 160 searches cache sets, rather than cache lines. Thus, to implement a set associative cache, the cache controller 160 must include a comparator circuit for each line (entry) in a set (i.e., two comparators for a two-way associative cache, four comparators for a four-way associative cache etc.)

The type of set associative cache (i.e., two way associative, four way associative, eight way associative, etc.) actually implemented significantly impacts cache performance. Furthermore, the performance of the types of set associative cache varies depending upon the type of code the CPU 20 is executing. For example, as the number of lines (entries) per set in a cache decreases (e.g., from four way to two way set associative), the cache line size required in order for the set to store a constant amount of data necessarily increases. It follows that in the event of cache miss, the amount of data retrieved from memory and written to the cache also necessarily increases, and the accordingly a greater cache "miss penalty" is incurred.

On the other hand, as the number of lines per set decrease, and the cache lines accordingly increase, the cache implementation is more likely to take advantage of the spatial locality of memory references. That is, during code execution, the CPU 20 tends to access data having an address which is near the address of earlier accessed data, particularly when the CPU 20 is executing code which exhibits spatial locality. Thus, as the line/entry sizes increase, the blocks of data written to the cache in the event of a cache miss also increase, and subsequent CPU 20 access of cache 26 data is more likely to be successful (i.e., to result in a "hit".)

Once again then, the optimal selection of cache design parameters (e.g., type of set associative cache, cache replacement policy etc.) is dependent upon the type of code executed by the CPU 20. Thus, in connection with the selection of such parameters, it is desirable to first evaluate the code being executed.

In accordance with one aspect of the present invention, an algorithm is provided which functions to intelligently analyze a set of code instructions prior to CPU 20 execution of these instructions. The algorithm outputs a set of values representing optimal caching parameters based on the code evaluation.

Figure 4:
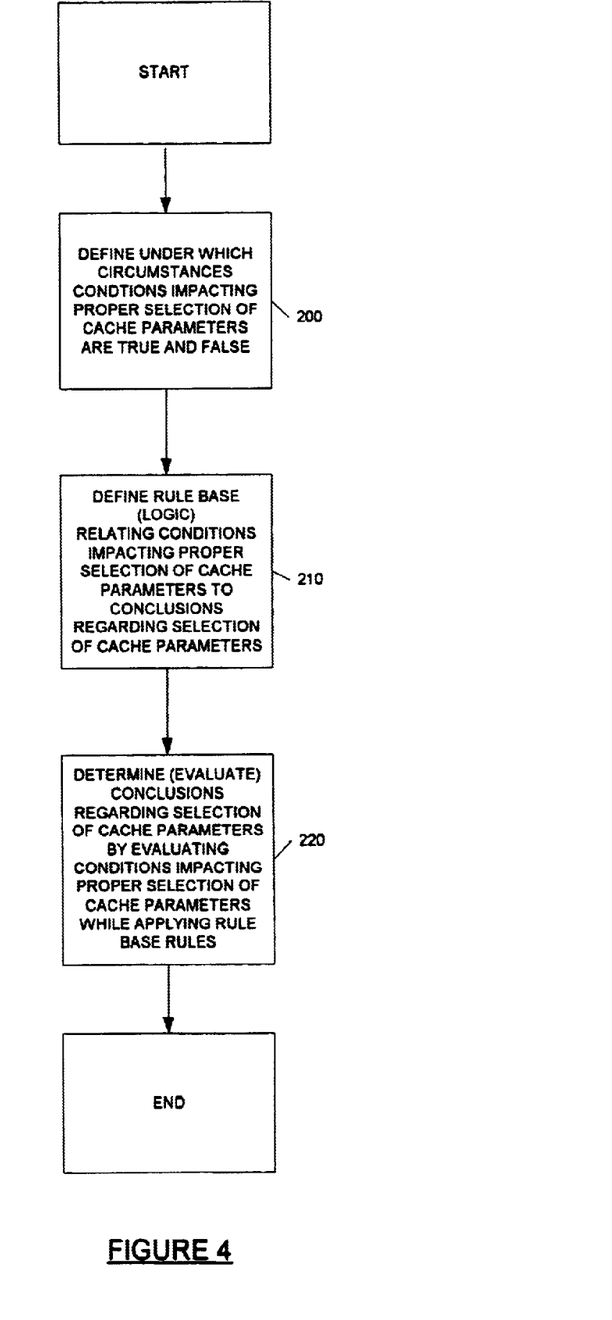
FIG. 4 is a high-level flow chart illustrating a cache parameter determination process in accordance with an embodiment of the present invention.

Turning now to FIG. 4, it shows a high level flow chart of a cache parameter determination algorithm in accordance with one embodiment of the present invention. In evaluating the code, the algorithm uses a set of code characteristics the presence of which, or the degree of presence of which, impact the proper selection of cache parameters. Thus, in Step 100, once the code characteristics have been selected, the algorithm uses, for example, boolean truth state tables or fuzzy logic membership set definitions to specify whether and when each code characteristic is true or false (i.e., present or absent) for a given set of code instructions.

For example, programs can be classified as having the following characteristics: 1) arithmetic intensive; 2) logic/decision intensive; 3) reference intensive; and/or 4) array/vector/table processing. To evaluate the code, the degree of presence or absence of these characteristics must be described in logical fashion. To achieve this, in accordance with one embodiment of the present invention, the assembly code to be executed is examined and the operators contained therein are classified as one of the following: 1) Arithmetic (A)—including integer and floating point operation; 2) Program Control (PC)—including conditional and unconditional branches, comparing operators; 3) Array/Vector/String (AV)—including string manipulation, array and vector processing operators; 4) Load/Store (LS)—including load reference, load value and store operators; and 5) Stack Manipulation (SM)—including PUSH, POP, Procedure Enter and Return operators. Next, the number of operators in each class is counted and the number of operators in each class as a percentage of the whole is accordingly determined. Furthermore, given these results, the number of instances of each class of operator can be classified as a small number of operators (SN), medium number of operators (MN) or large number of operators (LN). In this way, the presence or absence of a particular code characteristic (e.g., "Arithmetic") can be described logically by describing whether there exists a small number (SN), medium number (MN) or large number (LN) of the corresponding operator types.

For example, a Boolean membership function SN(x) (Small Number (x)) could be characterized such that, given an input "x" representing the number of operators in a particular class as a percentage of the whole, SN(x) outputs 1 ("true") if the percentage is less than or equal to 10%, and outputs 0 ("false") otherwise. Similarly, a Boolean membership function MN(x) (Medium Number (x)) could be characterized such that, given an input "x" representing the number of operators in a particular class as a percentage of the whole, MN(x) outputs 1 ("true") if the percentage is less than 90% but more than 10%, and outputs 0 ("false") otherwise. Lastly, a Boolean membership function LN(x) (Large Number (x)) could be characterized such that, given an input "x" representing the number of operators in a particular class as a percentage of the whole, LN(x) outputs 1 ("true") if the percentage is greater than or equal to 90%, and outputs 0 ("false") otherwise. Thus, for example, given the number of Arithmetic type operators as a percentage of operators in the whole code, these Boolean functions can be used to describe mathematically whether or not there is large number of arithmetic operators, a medium number of arithmetic operators or a small number of arithmetic operators. These Boolean results can in turn, be used to characterize whether the code operations are Arithmetic, Program Control, Array/Vector/String, Load/Store or Stack Manipulation in nature. As shown below, the algorithm of the present invention can then use these characteristics, couple with a rule base of implications, to properly determine the implications of these characteristics for proper cache parameter selection.

However, those skilled in the art will recognize that the concepts of a "small" number, "medium" number or "large" number of operators are generally considered "fuzzy" concepts (i.e., the statements are not optimally evaluated as true or false, but rather as having degrees truth or falsehood). For example, the Boolean function LN(x) outputs "true" if the percentage of operators is 91%, but outputs false if the percentage of operators exactly equals 90%. Thus, the function does not optimally capture that the arithmetic nature of a code set having the former percentage of arithmetic operators changes relatively slight as compared with a code set having the latter percentage of operators. Yet, it is typically precisely "fuzzy" concepts characterizing a code set that a developer must intelligently use to optimize the cache design parameters.

Figure 6:
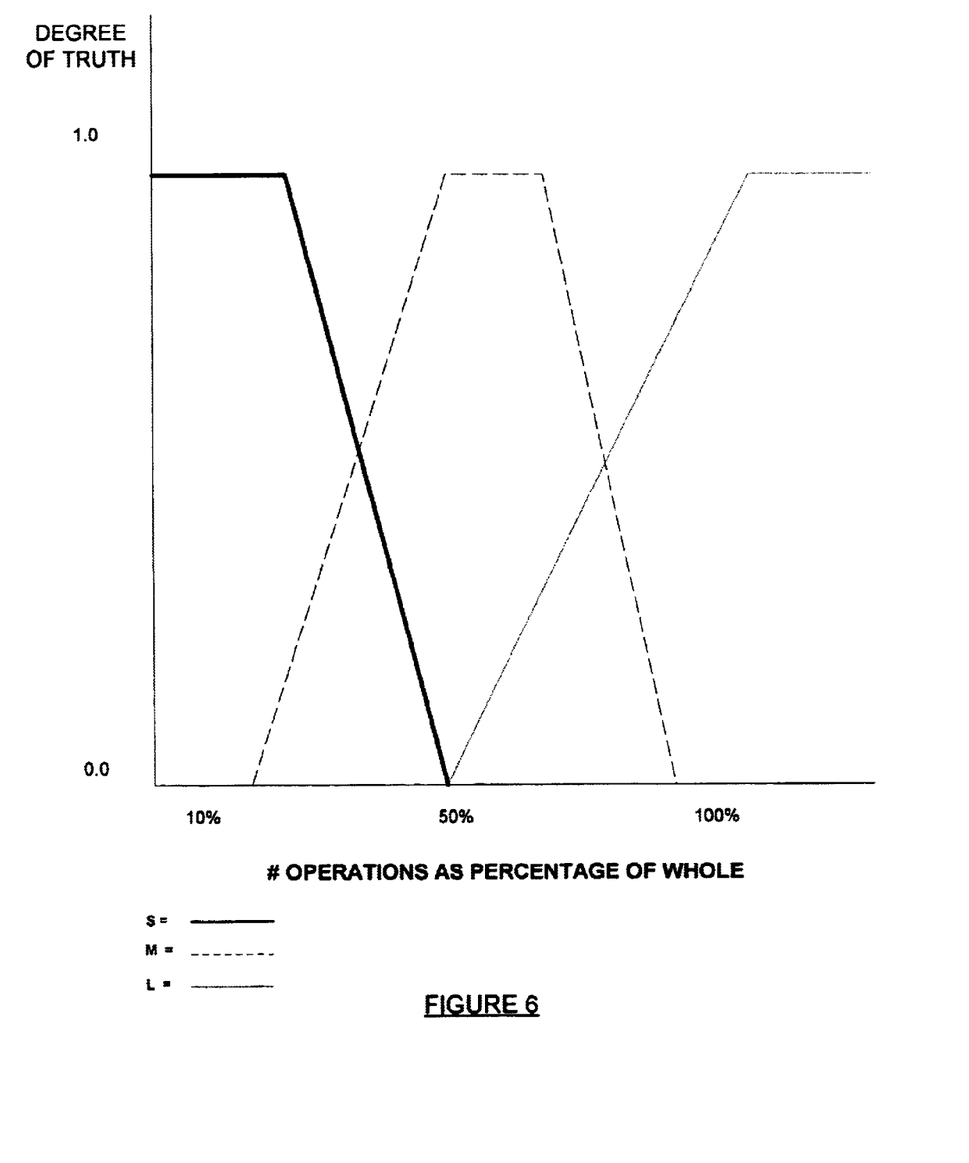
FIG. 6 illustrates graphically possible functional definitions characterizing the degree to which a chosen set of fuzzy conditions impacting the proper selection of cache parameters are true or false (i.e., present or absent) given a particular set of code features.

Thus, in a preferred embodiment of the present invention, to logically evaluate and relate such "fuzzy" concepts, the algorithm uses fuzzy logic membership functions to determine the degree to which there exist a small number, medium number or large number of instances of a particular class of operator. Turning now to FIG. 6, it illustrates graphically possible function definitions characterizing the degree to which there exist a small number, a medium number or a large number of a instances of a particular class operator. Put another way, given a set tally of operator counts determined from an set of input code, FIG. 6 defines graphically the extent which the following fuzzy concepts are true or false: 1) "there are a small number of x type (e.g., arithmetic) operators;" 2) "there are a medium number of x type operators;" and 3) "there are a large number of x type operators." Thus, the y-axis shows a continuum from 0 (completely false) to 1.0 (completely true). As illustrated, the fuzzy concept "there are a small number of operators" is completely true if the number of operators of a given type as a percentage of the whole is less than 13% or so. The truth of the statement decreases incrementally until as the percentage increases. If the percentage is 50% or more, the statement is completely false.

Turning back to FIG. 4, once it defines the circumstances in which the conditions impacting proper selection of cache parameters (e.g., the arithmetic or program control nature of the code) are true or false, the algorithm proceeds to step 210. In Step 210, the algorithm defines a logic rule base which relates (e.g., by implication) the presence or absence (i.e., truth or falsehood) of the condition impacting proper selection of cache parameters to conclusions regarding the selection of cache parameters. For example, the implication "IF A is LN then SRP=RAND," where "A is LN" evaluates to true only if the code includes a large number of arithmetic operators, will set SRP, a cache replacement policy variable, to RANDOM if the code includes a large number of arithmetic operators.

However, as noted earlier, the code conditions impacting the proper choice of cache parameters are best described as fuzzy concepts. Therefore, it is desirable to use a logical framework which propagates the degree of presence or absence (i.e., truth or falsehood) of the code characterstics/condition to degrees of confidence that particular cache parameters should be implemented. The field of fuzzy logic provides such a framework.

For example, in the preferred embodiment described herein, the algorithm optimized two types of cache parameters: the level of set associativity (i.e., the number of sets) and the cache replacement policy. Thus, the algorithm defines a fuzzy logic rule base that ultimately yields two outputs. Such a rule base could be constructed a follows:

Rule #1: IF SM is LN then #SETS=2/SC|SRP=WLRU
Rule #2: If PC is PN then #STES=4|SRP=LRU
Rule #3: IF AVS is LN then #SETS=4|SRP=RAND
Rule #4: IF A is LN then #SETS=2|SRP=RAND
Rule #5: IF LS is LN then #SETS =2/SC|SRP=LRU
Rule #6: IF SM is MN and LS is MN then #SETS=2/SC|SRP=WLRU
Rule #7: IF SM is MN and PC is MN then #SETS=2/SC|SRP=WLRU
Rule #8: IF PC is MN and LS is MN then #SETS=4|SRP=LRU
Rule #9: If AVS is MN and A is MN then #SETS=2|SRP=RAND
Rule #10: If SM is MN and LS is MN and PC is MN then #SETS=2/SC|SRP=WLRU
Rule #11: If SM is SN and PC is SN and AVS is SN and A is SN and LS is SN then #SETS=2|SRP=LRU.

In the above rule base, "A" represents the percentage of arithmetic operators. "PC" represents the percentage of Program Control operators. "AV" represents the percentage of Array/Vector/String manipulation operators. "LS" represents the percentage of Load Reference, Load value or store references. "SM" represents the percentage of stack manipulation operators. "#SETS" represents the proper level of cache associativity (i.e., either two sets, four sets or two sets with an area reserved as the stack cache, represented as "2/SC"). Finally, SRP represents the proper cache replacement policy (i.e., the set replacement policy) and evaluates to either "RAND" (Random), "LRU" (Least Recently Used), "WLRU" (Weighted Least Recently Used) or "WPS" (Weighted Page Selection).

As noted above, when the CPU 20 encounters a cache miss, a Random cache replacement policy implementation deletes a random cache entry to make room for the cache fill. A Least Recently Used policy deletes the cache entry least recently accessed by the CPU 20 to make room for the cache fill. A Weighted Least Recently Used policy which is a novel approach, gives some priority to stack address data as compared with other types of data. That is, the Weighted Least Recently Used policy deletes the cache entry least recently used by the CPU 20 but, all other things equal, stack addresses are less likely to be deleted than other types of data. A Weighted Page Selection policy, which is also a novel approach, counts the number of CPU 20 accesses for each cache page and based on that count assigns a priority to each cache page. The lowest priority cache page is replaced during a cache fill.

Note that the above rule base includes a default case (Rule #11) that ensures that the input space is completely covered from a physical standpoint. For example, all of the operator classes can never be a Large Number without the total being greater than 100%. Since the Small Number set covers operator numbers up to 50%, the last rule will catch any case not covered by the other rules. Note that thee rules are also consistent because there are no identical premises with different conclusions.

Turning back to FIG. 4, once the rule base is defined, the algorithm determines (evaluates) the conclusions regarding the proper selection of cache parameters by evaluating the conditions impacting the conclusions while applying the rule base rules. For example, using the simple Boolean embodiment described above, the algorithm encounters the implication "IF A is LN then SRP=RAND." The condition "A is LN" (i.e., "there are a large number of arithmetic operators") is evaluated as either 1 (true) or 0 (false) depending on the percentage of arithmetic operators contained in the code. Once the algorithm evaluates the condition, it sets SRP=RAND (i.e., chooses the Random Replacement Policy) only if there are a large number of arithmetic operators as defined using the Boolean membership function described earlier.

Again however, because there a number of conditions potentially impacting the proper selection of caching parameters, and because these conditions are best expressed as fuzzy concepts, in a preferred embodiment, the algorithm employs the fuzzy conditions and fuzzy logic rule base described above. For example, the algorithm might encounter rules 5 and 6:

Rule #5: IF LS is LN then #SETS =2/SC|SRP=LRU, and
Rule #6: IF SM is MN and LS is MN then #SETS=2/SC|SRP=WLRU.

In the presently described embodiment, the algorithm will evaluate the conditions "LS is LN" and "SM is MN and LS is MN" applying conventional rules for evaluating fuzzy conditions. For example, standard definitions in fuzzy logic include: a) truth (not x)=1.0—truth (x); b) truth (x and y)=minimum (truth(x), truth(y)); and c) truth (x or y)=maximum (truth(x), truth(y)). As applied to Rule #6 for example, the truth of "SM is MN and LS is MN"=minimum (truth(SM is MN), truth (LS is MN)). To put it another way, the degree of truth of the statement "there are a medium number of stack manipulation operators and there are a medium number of Load/store operators" is the minimum of the degree of truth of the statement "there are a medium number of stack manipulation operators" and the degree of truth of the statement "there are a medium number of Laod/store operators." Again, once the conditions and weight, if any, of each rule are determined, the algorithm propagates the results to various conclusions regarding the selection cache parameters using the conventions of fuzzy logic.

In the preferred embodiment described above, the algorithm uses the "Mandani Product" inference engine for computational simplicity. In accordance with the inference engine employed: 1) individual rule based inference with Union combination (maximum) is used; 2) Mandani product implication is applied, and 3) algebraic product for all t-norm operators and max for s-norm operators is computed. In effect, this inference engine propagates the values of the various conditions to various intermediate conclusions for each rule. Each intermediate conclusion is then used as a weight which is multiplied by a corresponding fuzzy outcome (e.g., #SETS=2/SC, SRP=WLRU) value equal to the point along an (arbitrary) set result continuum where the corresponding fuzzy outcome has its highest value.

Figure 7A:
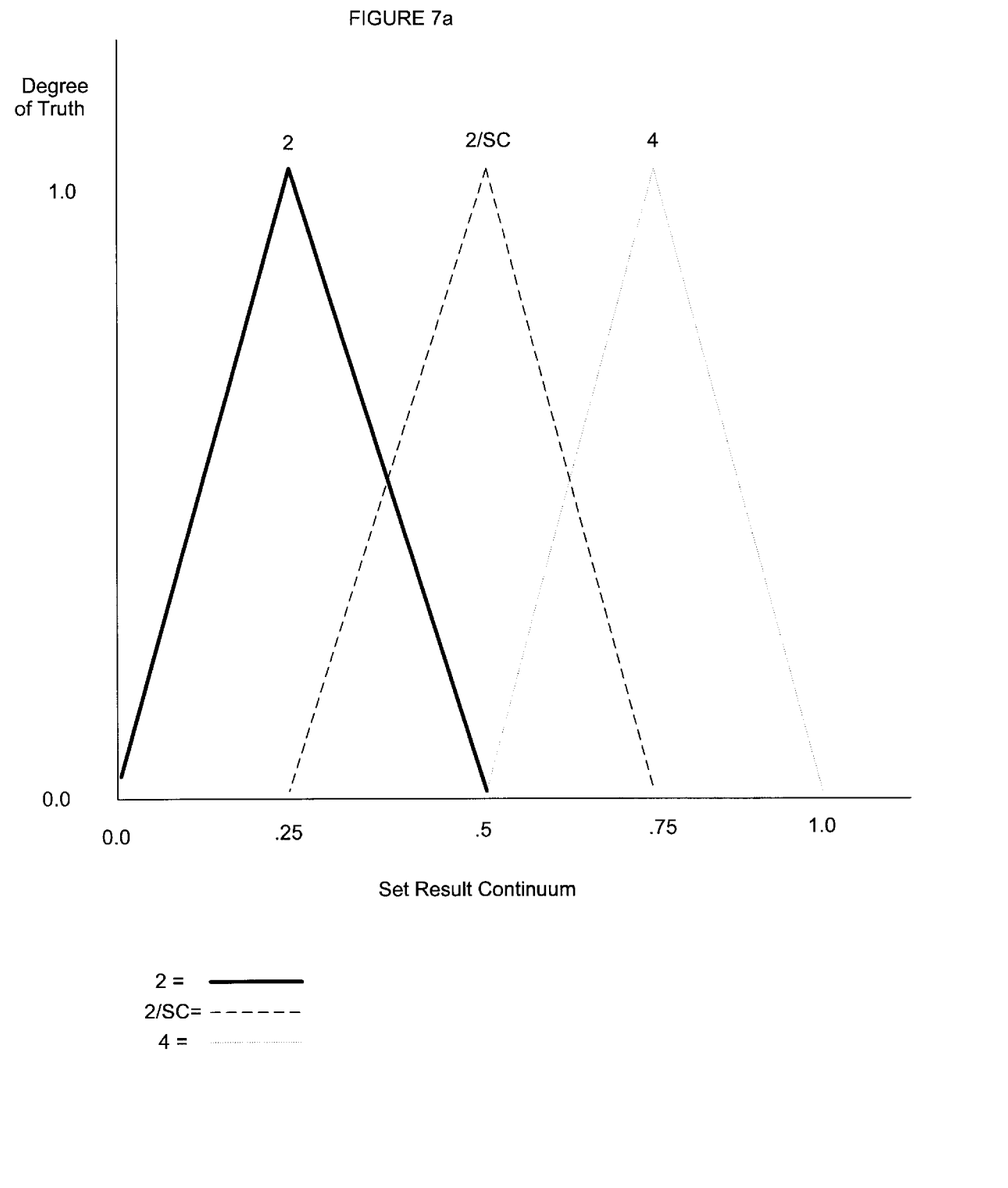
FIG. 7a illustrates graphically possible functional definitions characterizing the degree to which chosen fuzzy conclusions regarding cache set parameters are true or false (i.e., present or absent) along an arbitrary continuum from 0.0 to 1.0 which can be used to discretize the fuzzy conclusion values into meaningful decisions regarding cache parameters.
Figure 7B:
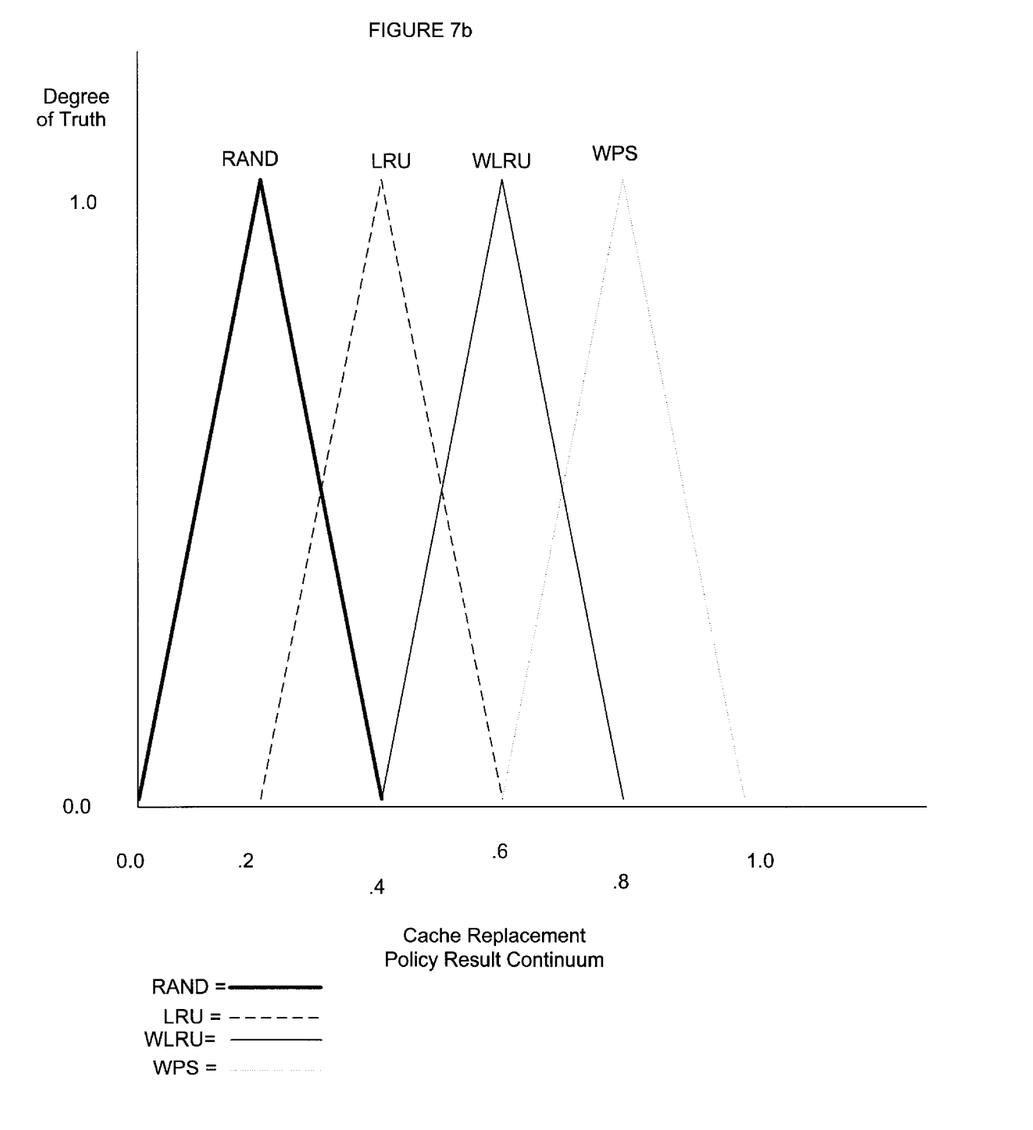
FIG. 7b illustrates graphically possible functional definitions characterizing the degree to which chosen fuzzy conclusions regarding cache replacement policy parameters are true or false (present or absent) along an arbitrary continuum from 0.0 to 1.0 which can be used to discretize fuzzy conclusion values into meaningful decisions regarding cache parameters.

For example, turning now to FIG. 7a, it illustrates graphically possible functional definitions characterizing the degree to which fuzzy outcomes regarding cache sets are true or false along the arbitrary continuum. The two set cache outcome is most "true" (i.e., desirable) at 0.25 in the set result continuum. "2/SC" is most true at 0.5 in the set result continuum. Finally, "4" is most true at 0.75 in the set result continuum. FIG. 7b shows a similar graph for the fuzzy outcomes regarding the cache replacement policy (i.e., "RAND", "LRU" etc.).

Figure 8A:
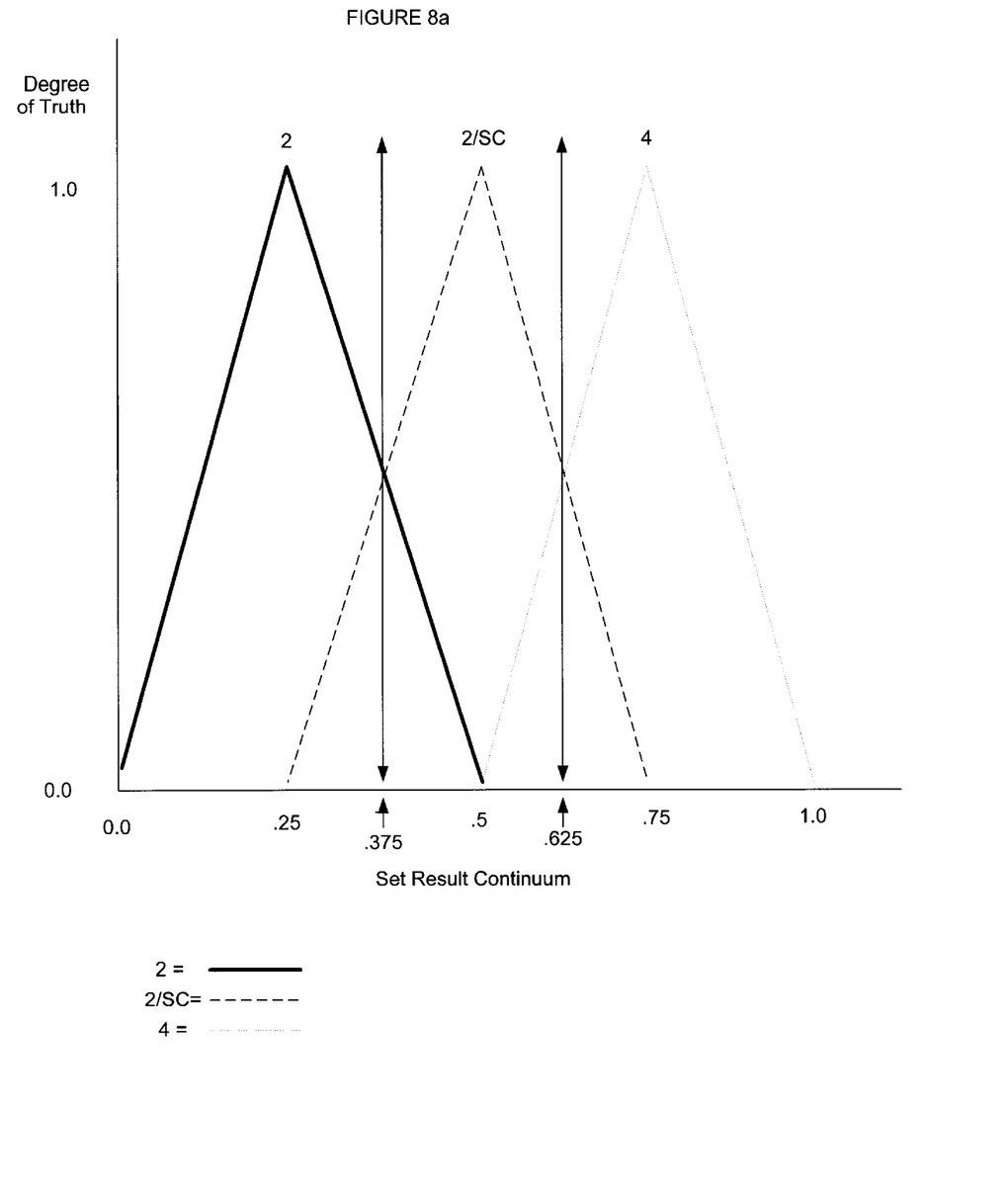
Figure 8B:
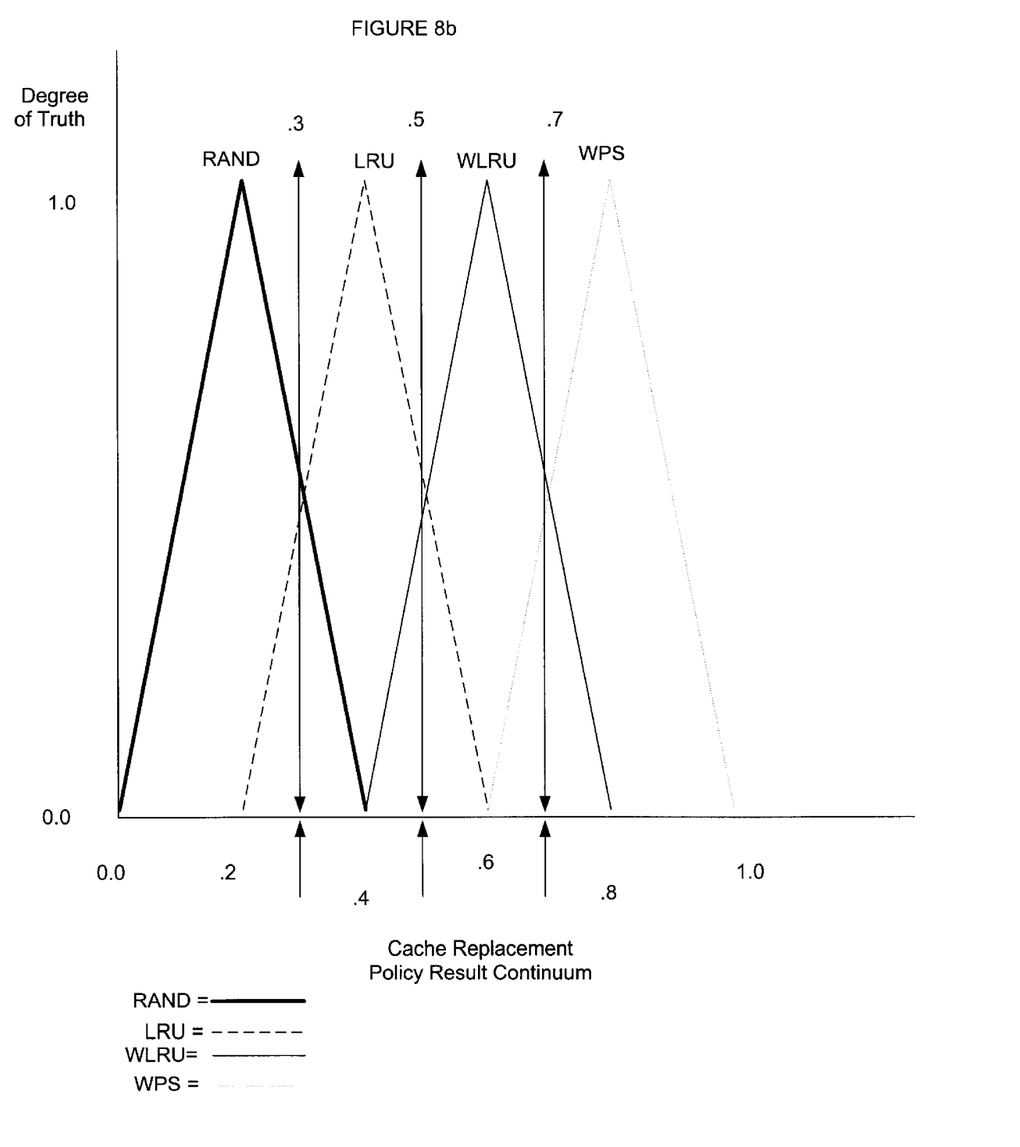
FIG. 8b illustrates graphically the discretization of the functional definitions illustrated in FIG. 7b.

Once the product (i.e., which is weighted time continuum value at which corresponding outcome is truest) for each rule is determined, the algorithm in accordance with a preferred embodiment of the present invention uses conventional, computationally efficient methods of finding the center of gravity of the resulting products. This center of gravity, for both the set cache parameters and the cache replacement policy parameters, will be a value along the set result continuum from 0.0 to 1.0. Finally, in order to give this value practical meaning, the value must be discretized as shown in FIGS. 8a and 8b. As illustrated in FIG. 8a, if the computed center of gravity for the various cache set outcomes is 0.375 or less, the outcome is discretized to a 2 cache set outcome (i.e., a two way set associative cache is chosen). If the computed center of gravity for the various cache set outcomes is greater than 0.375 but less than 0.625, the outcome is discretized to "2/SC". Similarly, if the compute center of gravity for the various cache set outcomes is greater than 0.625, the four way set associative cache is chosen.

Similarly, as illustrated in FIG. 8b, if the computed center of gravity for the various cache replacement policy outcomes is less than 0.3, the algorithm selects a random replacement policy. If the computed center of gravity for the various cache replacement policy outcomes is greater than 0.3 but less than 0.5, the algorithm selects a least recently used replacement policy. If the computed center of gravity for the various cache replacement outcomes is greater than 0.5 but less than 0.7, the algorithm selects a weighted least recently used replacement policy. Similarly, if the computed center of gravity fro the various cache replacement policy outcomes is greater than 0.7, the algorithm selects a weighted page selection replacement policy. The algorithm thus determines the optimal cache replacement policy and number of cache sets.

In one embodiment, the implementation of the algorithm may be included in the circuitry of a cache controller. Thus, the cache controller may scan code as it is returned from memory to determine the type of code being executed and may then set parameters in the cache. In another embodiment, the algorithm may also be implemented in the code execution section of the CPU 20. As the CPU 20 determined new cache parameters it could accordingly signal the cache controller 160. In another embodiment, the algorithm could also be implemented in the compiler code executed on the CPU 20 prior to execution of the code. This implementation would also involve adding a new operator to the code instruction set that could set the cache parameters. Putting the fuzzy algorithm in the compiler allows the algorithm to use more computer-intensive techniques during the defuzzification stage (i.e., because the algorithm is completed prior to code execution).

Whatever implementation is employed, a determination will generally be made as to when the cache parameters are changed or updated. The set replacement policy parameter may be changed at any time. However, changing the set number parameter is more difficult because that is in the cache must be purged as the mapping in the cache changes and the current data cannot be accessed with the new mapping. The update of the set number parameter accordingly preferably occurs when all/most of the data in the cache will be discarded anyway. Examples of this would be when a new program is being run or on a major procedure exit.

Conclusion

While certain aspects of the present invention are describe with particularity above, persons skilled in the art will recognize that various modifications and enhancements could be made to the examples provided without departing from the scope of the invention, which is defined by the claims below. For example, if the algorithm described is implemented in the cache controller circuitry 160, look up tables could be implemented in RAM. Hardware monitors could be implemented and the look up tables could be optimized with data obtained from running benchmarks and customer code on the actual hardware. If implemented in the compiler, the algorithm could be tested with several types of fuzzy inference engines, which would be evaluated for compiler performance. Furthermore, with the advent of faster hardware and software simulators, it is possible to tune the system with large quantities of real world code prior to implementation.

In addition, one important addition to the algorithm would be a negative feedback source. A cache hit rate monitor could be used to provide this feedback. An extra rule could be added to the rule base which would express: "if the hit-rate worsened significantly by changing the cache parameters, go back to the previous parameters."

Thus, a cache control system and algorithm has been presented which enhances cache performance by selecting cache design parameters based upon the type of code being executed.

What is claimed is:

1. A computer-based method for determining optimal cache design parameters for a memory cache associated with a CPU, the method comprising:
   a. executing an algorithm, said algorithm analyzing a series of instructions executable by the CPU, wherein the analysis involves describing in a logical fashion the degree of presence or absence of instructions having any one or more of the following characteristics: 1) arithmetic intensive; 2) logic/decision intensive; 3) reference intensive; and/or 4) array/vector/table processing; and
   b. determining an optimal choice for at least one cache design parameter based upon the analysis of the series of instructions, wherein the determining step involves the use of a logic rule base.

2. The computer-based method of claim 1 for determining the optimal cache design parameters wherein the step of analyzing the series of instructions includes classifying operators contained in the series of instructions into types.

3. The computer-based method of claim 2 for determining optimal cache design parameters recited wherein the step of analyzing the series of instructions includes determining the number of instances of each class in the code as a percentage of all operators in the code.

4. The computer-based method of claim 3 for determining optimal cache design parameters wherein the step of analyzing the series of instructions includes using the determination of the number of instances of a class in the code as a percentage of all operators to logically describe the degree of prevalence of the class in the code and defining a logic rule base to relate that degree of prevalence to values representing conclusions regarding the choice of optimal cache parameters.

5. A computer system capable of running a software program comprised of code instructions, the computer system comprising:
   a. a memory, the memory storing the code instructions,
   b. a data cache coupled to the memory and having a controller, the data cache storing data needed for execution of the code instructions, the controller having a cache control element, the cache control element comprised of cache instructions which, when executed by the cache controller, analyze the code instructions and determine and implement an optimal choice for at least one cache design parameter based upon the analysis of the code instructions, wherein the analysis involves describing in a logical fashion the degree of presence or absence of instructions having any one or more of at least the following characteristics; 1) arithmetic intensive; 2) logic/decision intensive; 3) reference intensive; or 4) array/vector/table processing; and
   c. a CPU coupled to the memory and the data cache, the CPU fetching the code instructions in memory and executing the code instructions during operation of the software program.

6. The computer system of claim 5 wherein the cache control element includes cache instructions which, when executed by the cache controller, classify operators contained in the series of code instructions into types.

7. The computer system of claim 6 wherein the cache control element includes cache instructions which, when executed by the cache controller, determine the number of instances of each class in the code instructions as a percentage of all operators in the code instructions.

8. The computer system of claim 7 wherein the cache control element includes cache instructions which, when executed by the cache controller, use the determination of the number of instances of a class in the code instructions as a percentage of all operators to logically describe the degree of prevalence of the class in the code instructions and define logic rule base to relate that degree of prevalence to values representing conclusions regarding the choice of optimal cache parameters.

9. A computer-based method for determining optimal cache design parameters for a memory cache associated with a CPU, the method comprising:
   executing an algorithm, said algorithm analyzing a series of instructions executable by the CPU; and
   determining an optimal choice for at least one cache design parameter based upon the analysis of the series of instructions;
   wherein the step of analyzing the series of instructions includes classifying operators contained in the series of instructions into types, determining the number of instances of each class in the code as a percentage of all operators in the code, and using the determination of the number of instances of a class in the code as a percentage of all operators to logically describe the degree of prevalence of the class in the code and defining a logic rule base to relate that degree of prevalence to values representing conclusions regarding the choice of optimal cache parameters; and
   wherein the step of determining an optimal choice for at least one cache design parameter includes applying the logic rule base to obtain at least one value representing a conclusion regarding the choice of an optimal cache parameter.

10. The computer-based method of claim 9 wherein the cache design parameters include parameters specifying a set replacement policy.

11. The computer-based method of claim 10 wherein the at least one value representing a conclusion regarding the choice of an optimal cache parameter represents choosing a random replacement policy as an optimal set replacement policy.

12. The computer-based method of claim 10 wherein the at least one value representing a conclusion regarding the choice of an optimal cache design parameter represents choosing a least recently used replacement policy as an optimal set replacement policy.

13. The computer-based method of claim 10 wherein the at least one value representing a conclusion regarding the choice of an optimal cache design parameter represents choosing a weighted least recently used replacement policy as an optimal set replacement policy.

14. The computer-based method of claim 10 wherein the at least one value representing a conclusion regarding the choice of an optimal cache design parameter represents choosing a weighted page selection replacement policy as an optimal set replacement policy.

15. The computer-based method of claim 9 wherein the cache design parameters include parameters specifying a number of cache sets.

16. The computer-based method of claim 15 wherein the at least one value representing a conclusion regarding the choice of an optimal cache parameter represents choosing a two sets as an optimal number of cache sets.

17. The computer-based method of claim 15 wherein the at least one value representing a conclusion regarding the choice of an optimal cache parameter represents choosing a four sets as an optimal number of cache sets.

18. The computer-based method of claim 15 wherein the at least one value representing a conclusion regarding the choice of an optimal cache parameter represents choosing a two sets with an area reserve as a stack cache as an optimal number of cache sets.

19. A computer system capable of running a software program comprised of code instructions, the computer system comprising
  a. a memory, the memory storing the code instructions,
  b. a data cache coupled to the memory and having a controller, the data cache storing data needed for execution of the code instruction, the controller having a cache control element, the cache control element comprised of cache instructions which, when executed by the cache controller, analyze the code instructions and determine and implement an optimal choice for at least one cache design parameter based upon the analysis of the code instructions; and
  c. a CPU coupled to the memory and the data cache, the CPU fetching the code instructions in memory and executing the code instructions during operation of the software program;
  wherein the cache control element includes cache instructions which, when executed by the cache controller, classify operators contained in the series of code instructions into types; cache instructions which, when executed by the cache controller, determine the number of instances of each class in the code instructions as a percentage of all operators in the code instructions; and cache instructions which, when executed by the cache controller, use the determination of the number of instances of a class in the code instructions as a percentage of all operators to logically describe the degree of prevalence of the class in the code instructions and define a logic rule base to relate that degree of prevalence to values representing conclusions regarding the choice of optimal cache parameters; and
  wherein the cache control element includes cache instructions which, when executed by a cache controller apply the logic rule base to obtain at least one value representing a conclusion regarding the choice of an optimal cache parameter.

20. The computer system of claim 19 wherein the cache design parameter is a set replacement policy for the cache.

21. The computer system of claim 20 wherein the at least one value representing a conclusion regarding the choice of an optimal cache parameter represents choosing a random replacement policy as an optimal set replacement policy for the cache.

22. The computer system of claim 20 wherein the at least one value representing a conclusion regarding the choice of an optimal cache parameter represents choosing a least recently used replacement policy as an optimal set replacement policy for the cache.

23. The computer system of claim 20 wherein the at least one value representing a conclusion regarding the choice of an optimal cache parameter represents choosing a weighted least recently used replacement policy as an optimal set replacement policy for the cache.

24. The computer system of claim 20 wherein the at least one value representing a conclusion regarding the choice of an optimal cache design parameter represents choosing a weighted page selection replacement policy as an optimal set replacement policy.

25. The computer system of claim 19 wherein the cache design parameter is a number of cache sets.

26. The computer system of claim 25 wherein the at least one value representing a conclusion regarding the choice of an optimal cache parameter represents choosing two sets as an optimal number of cache sets for the cache.

27. The computer system of claim 25 wherein the at least one value representing a conclusion regarding the choice of an optimal cache parameter represents choosing a four sets as an optimal number of cache sets for the cache.

28. The computer system of claim 25 wherein the at least one value representing a conclusion regarding the choice of an optimal cache parameter represents choosing two sets with an area reserve as a stack cache as an optimal number of cache sets for the cache.

* * * * *